US012803033B2

(12) United States Patent
Kwon et al.

(10) Patent No.: US 12,803,033 B2
(45) Date of Patent: Nov. 17, 2026

(54) BATTERY TRAY AND METHOD FOR MANUFACTURING BATTERY USING SAME

(71) Applicant: LG ENERGY SOLUTION, LTD., Seoul (KR)

(72) Inventors: Hyun Cheol Kwon, Daejeon (KR); Ji Won Park, Daejeon (KR); Pil Kyu Park, Daejeon (KR); Sung Kwan Doh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 461 days.

(21) Appl. No.: 18/290,071

(22) PCT Filed: Nov. 18, 2022

(86) PCT No.: PCT/KR2022/018299
§ 371 (c)(1),
(2) Date: Nov. 9, 2023

(87) PCT Pub. No.: WO2023/090933
PCT Pub. Date: May 25, 2023

(65) Prior Publication Data

US 2024/0282999 A1 Aug. 22, 2024

(30) Foreign Application Priority Data

Nov. 19, 2021 (KR) ........................ 10-2021-0160203

(51) Int. Cl.
*H01M 10/04* (2006.01)
*H02J 7/00* (2006.01)

(52) U.S. Cl.
CPC ......... *H01M 10/0404* (2013.01); *H02J 7/875* (2026.01)

(58) Field of Classification Search
CPC ............. H01M 4/0447; H01M 50/213; H01M 10/6561; H01M 10/6566
See application file for complete search history.

(56) References Cited

U.S. PATENT DOCUMENTS

2007/0009787 A1* 1/2007 Straubel ............. H01M 10/643 429/100
2010/0330404 A1* 12/2010 Nishino ............. H01M 50/213 429/82

(Continued)

FOREIGN PATENT DOCUMENTS

CN 207045959 U 2/2018
CN 207441885 U 6/2018

(Continued)

OTHER PUBLICATIONS

English translation of CN 209905328, He, X., Jan. 7, 2020, obtained Mar. 23, 2026 from: < https://worldwide.espacenet.com/ > (Year: 2026).*

(Continued)

*Primary Examiner* — Claire X Wang
*Assistant Examiner* — Patrick M McCarty
(74) *Attorney, Agent, or Firm* — Birch, Stewart, Kolasch & Birch, LLP

(57) ABSTRACT

A battery tray having multiple insertion holes into which charge/discharge terminals are inserted and multiple heat dissipation holes for air flow are formed at the bottom of a housing in which the batteries are accommodated. Heat can smoothly flow through the heat dissipation holes, and even if there is a difference in the location where the battery is accommodated depending on the center or the outer edge of the tray, the temperature deviation is reduced.

11 Claims, 7 Drawing Sheets

(56) References Cited

U.S. PATENT DOCUMENTS

| | | | | |
|---|---|---|---|---|
| 2011/0039142 | A1 | 2/2011 | Kwag et al. | |
| 2022/0247027 | A1 * | 8/2022 | Kahmke | H01M 10/6572 |
| 2023/0395914 | A1 * | 12/2023 | Ohta | H01M 50/213 |

FOREIGN PATENT DOCUMENTS

| | | | |
|---|---|---|---|
| CN | 207542302 | U | 6/2018 |
| CN | 207810046 | U | 9/2018 |
| CN | 209905328 | U | 1/2020 |
| CN | 209905329 | U | 1/2020 |
| CN | 210741045 | U | 6/2020 |
| CN | 213401301 | U | 6/2021 |
| KR | 10-2010-0123828 | A | 11/2010 |
| KR | 20-0453750 | Y1 | 5/2011 |
| KR | 10-2015-0049972 | A | 5/2015 |
| KR | 10-1625716 | B1 | 5/2016 |
| KR | 10-2020-0127460 | A | 11/2020 |

OTHER PUBLICATIONS

English translation of KR20200127460A, Jung et al., Nov. 11, 2020, obtained Mar. 24, 2026 from: < https://worldwide.espacenet.com/ > (Year: 2026).*

English translation of KR 200453750Y1, Kim, May 26, 2011, obtained Mar. 24, 2026 from: < https://worldwide.espacenet > (Year: 2026).*

English translation of CN 210741045U, Wang et al., Jun. 12, 2020, obtained Mar. 24, 2026 from: < https://worldwide.espacenet.com/ > (Year: 2026).*

Extended European Search Report for European Application No. 22896130.6, dated Jan. 29, 2025.

International Search Report (PCT/ISA/210) issued in PCT/KR2022/018299, dated Mar. 2, 2023.

* cited by examiner

[FIG. 1] CONVENTIONAL ART
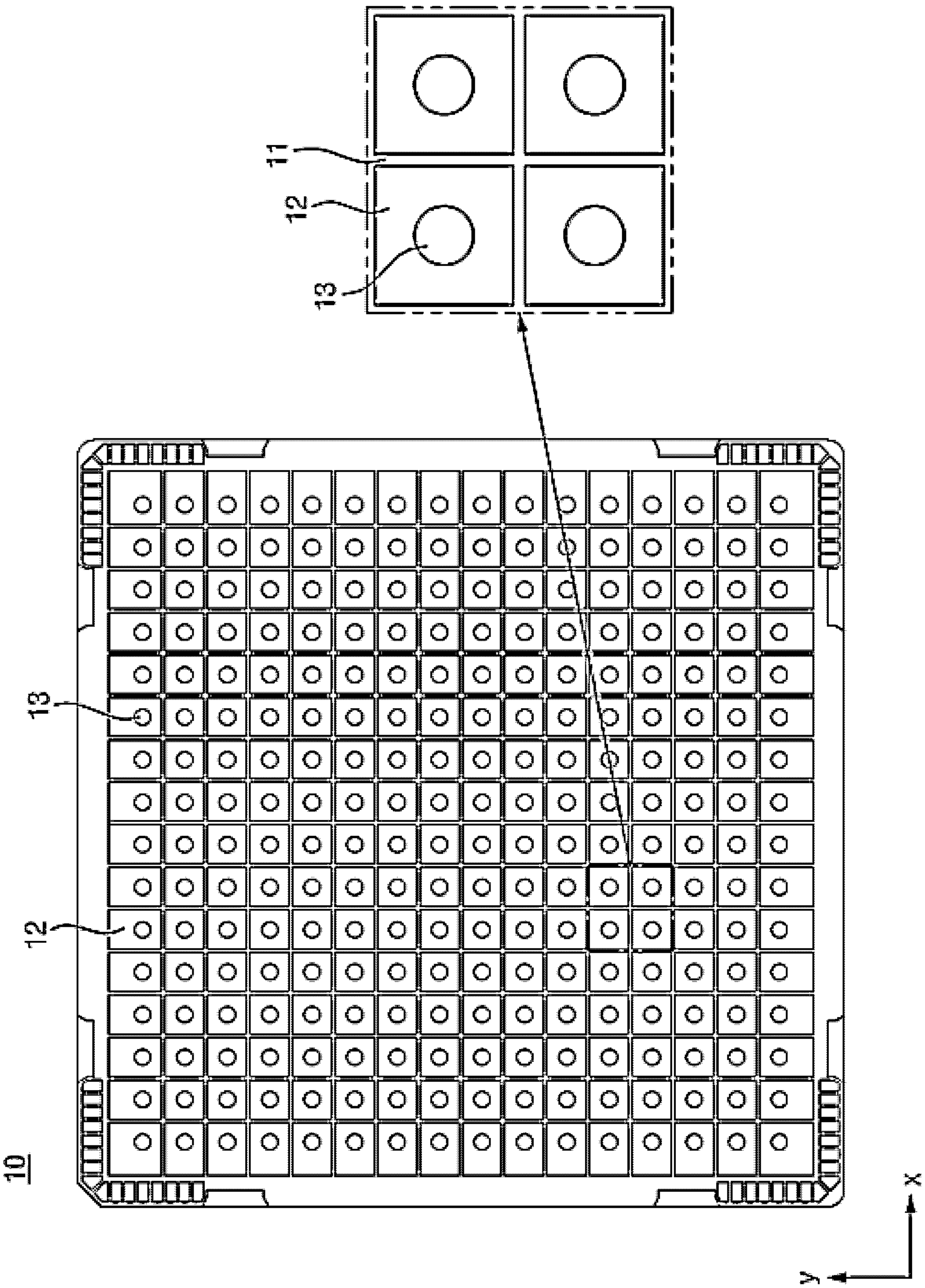

[FIG. 2]
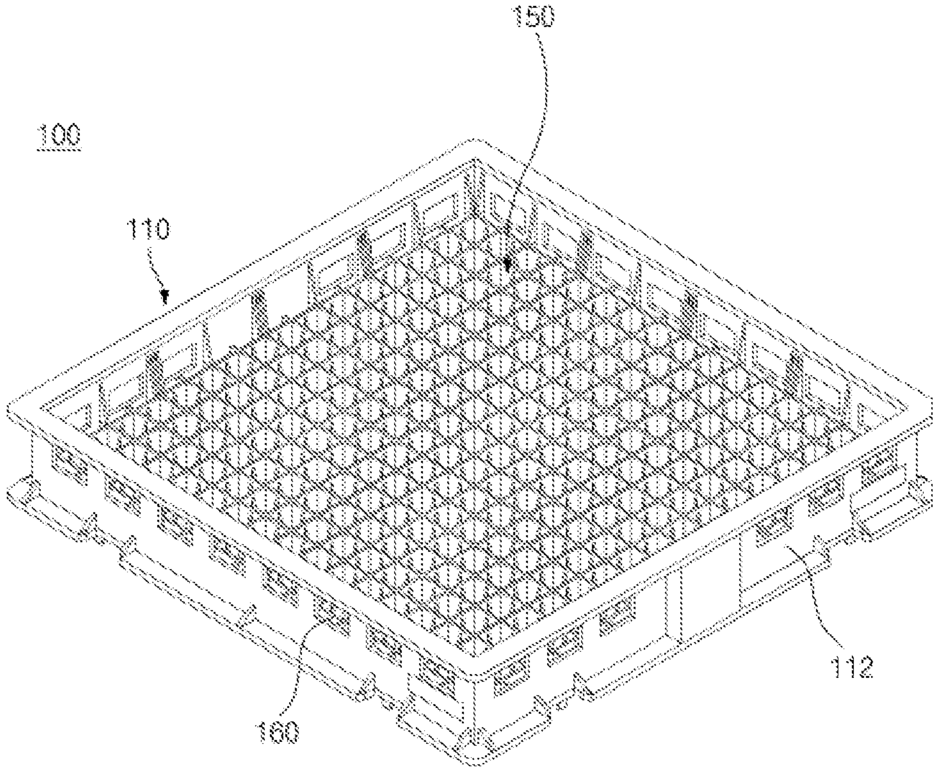

[FIG. 3]
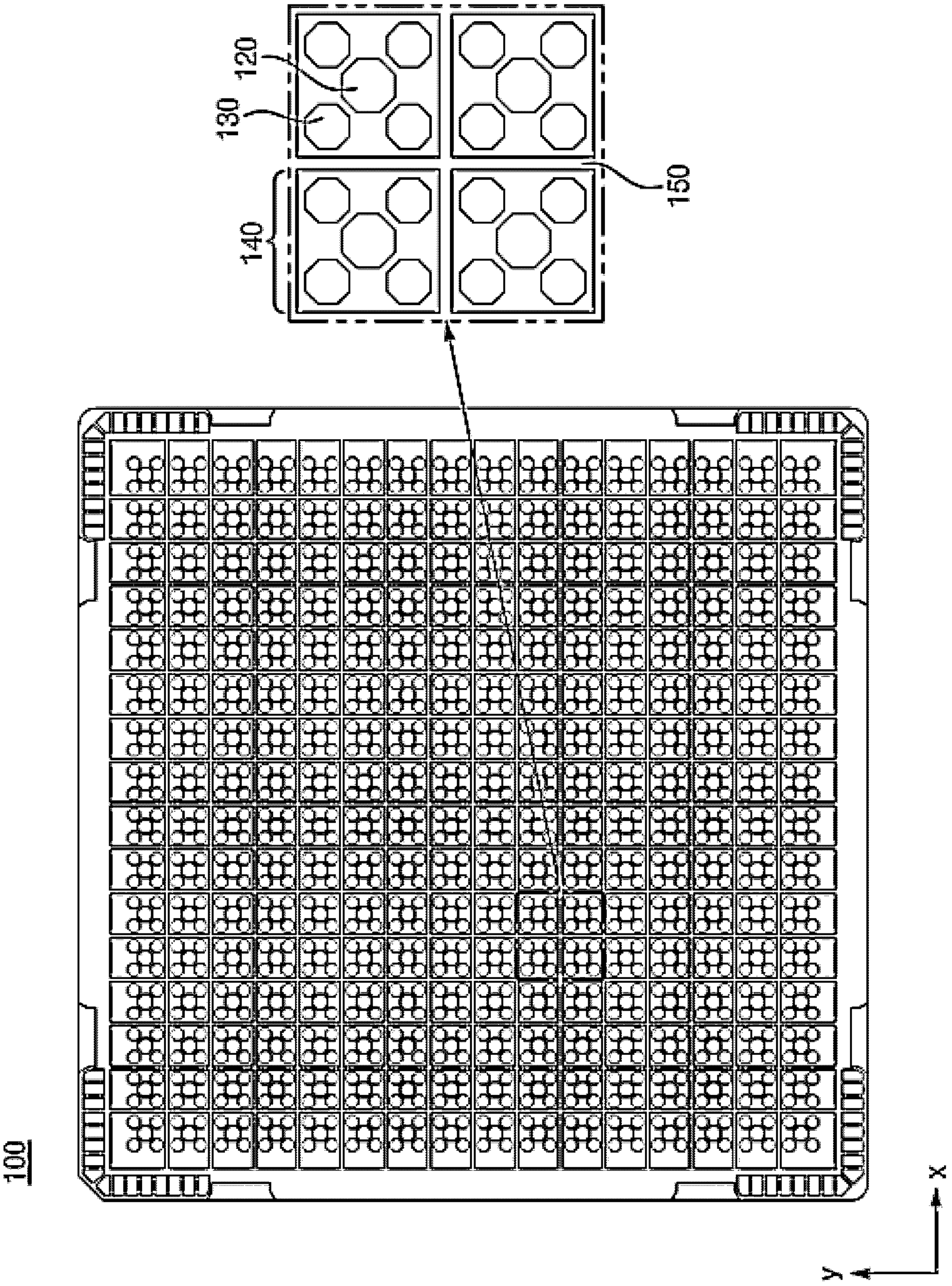

[FIG. 4]
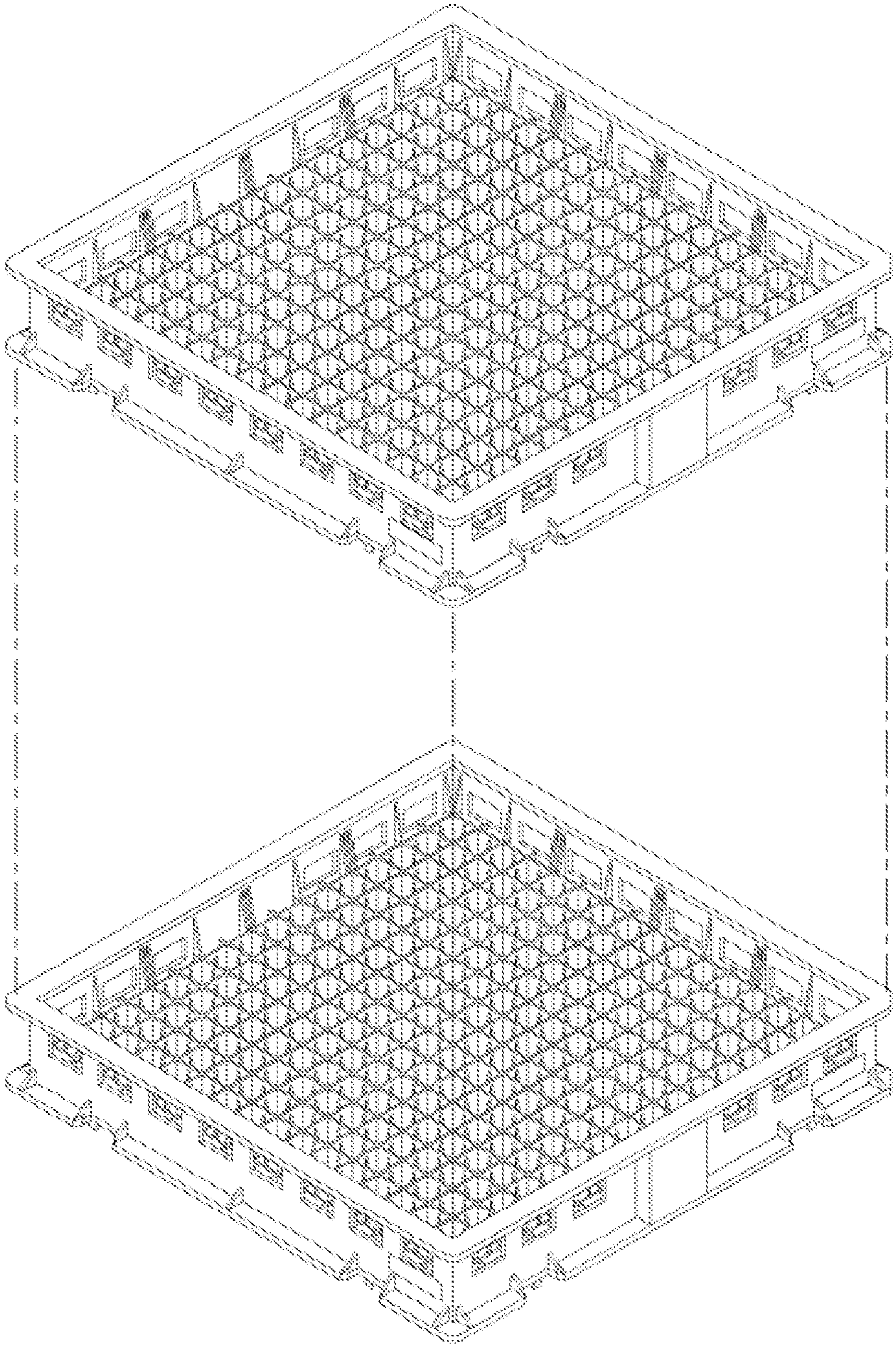

[FIG. 5]
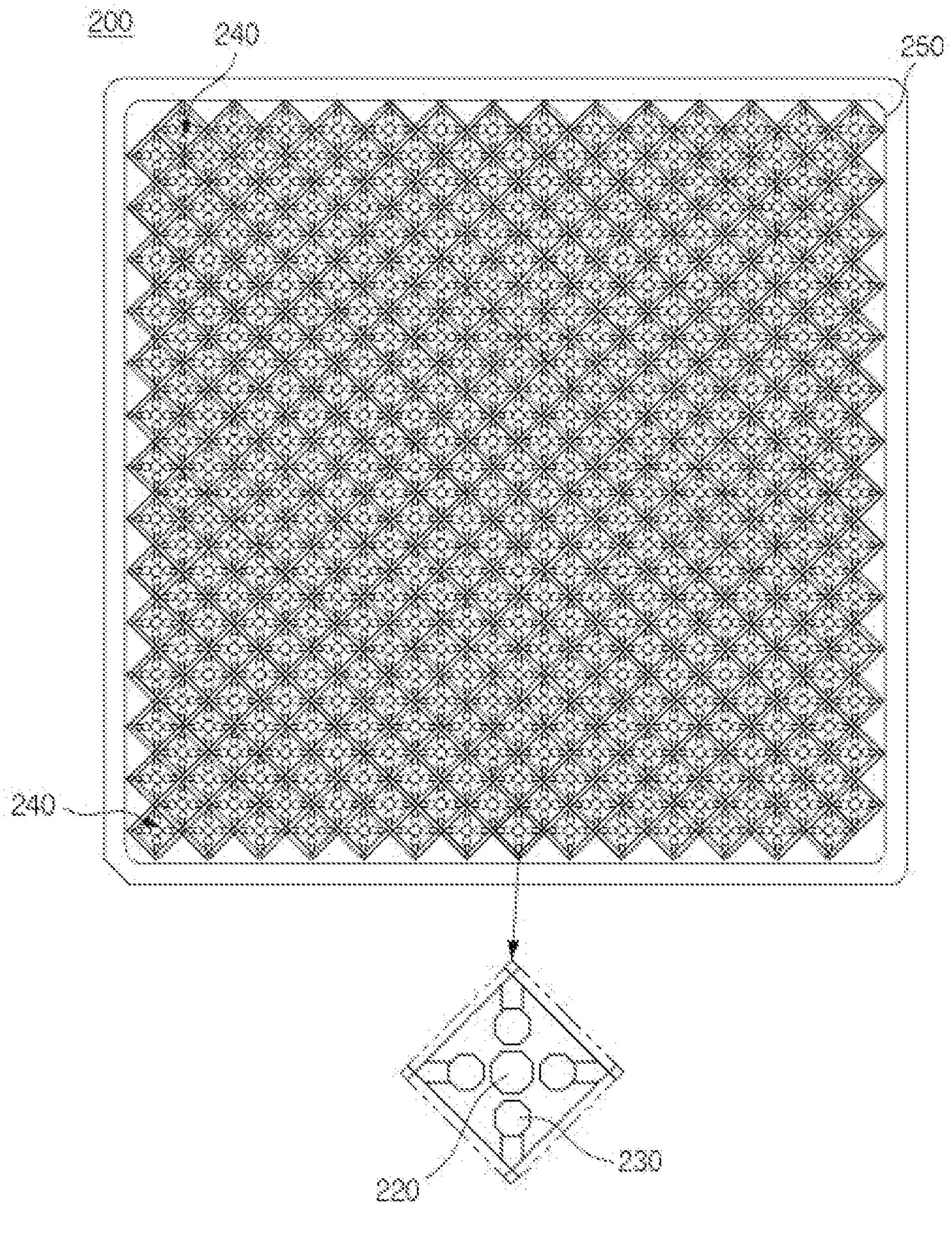

[FIG. 6]
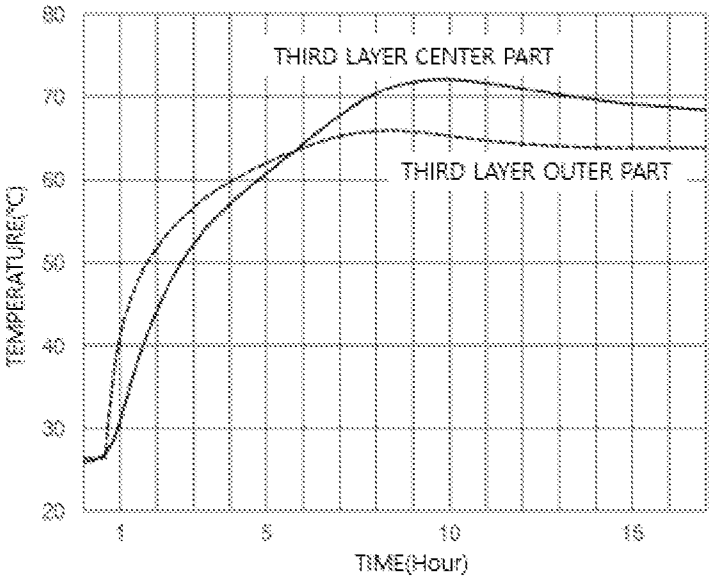

[FIG. 7]
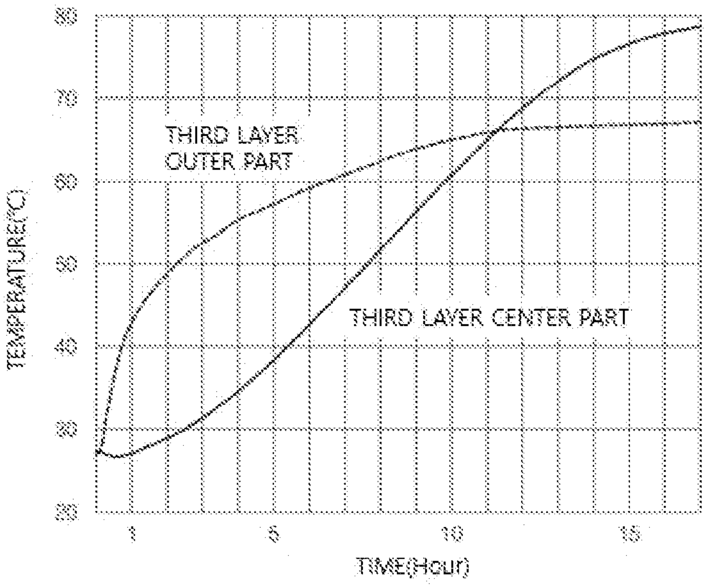

BATTERY TRAY AND METHOD FOR MANUFACTURING BATTERY USING SAME

TECHNICAL FIELD

This application claims the benefit of a priority based on Korean Patent Application No. 10-2021-0160203 on Nov. 19, 2021.

The present invention relates to a battery tray capable of improving a temperature deviation in a battery activation process and a method for manufacturing a battery using the same.

BACKGROUND TECHNOLOGY OF THE INVENTION

Current commercially available secondary batteries include nickel cadmium batteries, nickel hydride batteries, nickel zinc batteries, lithium secondary batteries, and the like. Among them, lithium secondary batteries are in the limelight because of their advantages of being freely charged and discharged, having a low self-discharge rate, and having a high energy density, since memory effect hardly occurs compared to nickel-based secondary batteries.

These lithium secondary batteries mainly use lithium-based oxides and carbon materials as positive and negative electrode active materials, respectively. Lithium secondary batteries include: an electrode assembly in which unit cells having a structure of a positive electrode plate coated with a positive electrode active material on a positive electrode current collector, and a negative electrode plate coated with a negative electrode active material on a negative electrode current collector are arranged with a separator interposed therebetween are combined; and an exterior material, in other words a battery case, for sealing and housing the electrode assembly together with an electrolyte. Depending on the shape of the battery case, the lithium secondary battery is classified into a can-type secondary battery in which the electrode assembly is embedded in a cylindrical or a prismatic metal can and a pouch-type secondary battery in which the electrode assembly is embedded in a pouch of an aluminum laminate sheet.

Meanwhile, a secondary battery is manufactured through a process of assembling a cell and a process of activating the battery. In the battery activation step, the battery is loaded on a tray, and charging/discharging and aging are performed under conditions necessary for activation.

In this activation step, self-heating of the battery occurs up to a temperature higher than the set temperature due to chemical reactions during charging and discharging of the battery and high-temperature aging, and since self-heating of the battery may cause deterioration in the performance of the battery, the battery is cooled to an appropriate temperature by blowing air through the battery in order to control self-heating.

FIG. 1 is a top view of a conventional battery tray accommodating multiple conventional cylindrical batteries. Referring to FIG. 1, a conventional battery tray 10 is provided with pockets 12 for accommodating multiple batteries at a constant pitch. These pockets 12 are formed at a constant pitch in the X-direction (width direction) and Y-direction (longitudinal direction), respectively, and batteries are accommodated in these pockets 12 one by one.

A partition wall 11 is installed in the battery tray 10, and a square pocket 12 is formed so as to be surrounded on all sides by the partition wall 11. In addition, an insertion hole 13 into which a charge/discharge terminal is inserted is formed in the bottom part, and the charge/discharge terminal is electrically connected to the batteries stored inside the tray through the insertion hole so that the batteries can be charged and discharged under conditions necessary for activation while being stored in the tray.

Meanwhile, in order to activate multiple batteries, the battery tray performs an activation step in a state in which multiple trays accommodating batteries are stacked. In this case, the conventional battery tray structure does not have a smooth heat flow, thereby causing a non-uniform cooling depending on the position of the accommodated battery.

Therefore, it is necessary to develop a technology for a battery tray capable of improving heat flow in the center and outer parts of the tray and heat flow in the upper and lower parts when the trays are stacked.

DESCRIPTION OF THE INVENTION

Technical Problem

The present invention is to solve the problems of the prior art, and it is directed to provide a battery tray of a novel structure that can improve the temperature deviation according to the accommodating position of the battery by improving the heat flow of the tray.

Technical Solution

The battery tray according to an exemplary embodiment of the present invention is a battery tray for accommodating multiple batteries during the battery manufacturing process, in which the battery tray has a housing having a bottom, the bottom having a plurality of insertion holes configured to receive charge/discharge terminals and a plurality of heat dissipation holes configured to provide air flow.

The battery tray according to an exemplary embodiment of the present invention includes a plurality of partition walls defining a plurality of pockets, each pocket being configured to store a battery.

In an exemplary embodiment of the present invention, one insertion hole is located at a bottom portion of each pocket.

In an exemplary embodiment of the present invention, the insertion hole is located at a center of the bottom portion of the pocket.

In an exemplary embodiment of the present invention, at least one heat dissipation hole of the plurality of heat dissipation holes is located on an outer periphery of a corresponding insertion hole.

In an exemplary embodiment of the present invention, two to five heat dissipation holes are located on the outer periphery of each insertion hole.

In an exemplary embodiment of the present invention, a diameter of each heat dissipation hole is 3 mm to 12 mm.

In an exemplary embodiment of the present invention, the housing further includes side walls vertically extending from four edges of the bottom part, each side wall having a predetermined height.

In an exemplary embodiment of the present invention, multiple side wall heat dissipation holes are located in each side wall.

The battery tray according to an exemplary embodiment of the present invention has a structure capable of stacking multiple battery trays in the vertical direction.

The battery tray according to an exemplary embodiment of the present invention has an open top, and each pocket is configured to store a cylindrical battery therein in a standing state.

A manufacturing method of a battery of the present invention includes accommodating a plurality of batteries in the battery tray; and activating the plurality of batteries in the battery tray.

Advantageous Effects

The battery tray of the present invention is provided with a heat dissipation hole at the bottom part, so that the heat generated from the battery flows smoothly through the heat dissipation hole, and even if there is a difference in the location where the battery is accommodated depending on the center or the outer edge of the tray, the temperature deviation is reduced.

In addition, in terms of the conventional tray, there is an effect of improving a problem that may cause deterioration of the battery due to decrease in cooling efficiency for the battery stored in the corresponding position by having a poor heat flow in its center part.

BRIEF DESCRIPTION OF THE DRAWINGS

FIG. 1 is a top view of a conventional battery tray accommodating multiple conventional cylindrical batteries.

FIG. 2 is a perspective view of a battery tray according to an exemplary embodiment of the present invention.

FIG. 3 is a top view of a battery tray according to an exemplary embodiment of the present invention.

FIG. 4 is a diagram showing a state in which battery trays are stacked according to an exemplary embodiment of the present invention.

FIG. 5 is an enlarged diagram of one vertex in a top view of a battery tray according to another exemplary embodiment of the present invention.

FIG. 6 is a graph showing the temperature measurement results of the experimental example with respect to the tray of Example 2 of the present invention.

FIG. 7 is a graph showing the temperature measurement results of the experimental example with respect to the tray of the comparative example.

REFERENCE NUMERALS

10, 100, 200: BATTERY TRAY
110: HOUSING
112: SIDE WALL
13, 120, 220: INSERTION HOLE
130, 230: HEAT DISSIPATION HOLE
12, 140, 240: POCKET
11, 150, 250: PARTITION WALL
160: SIDE WALL HEAT DISSIPATION HOLE

BEST MODE FOR CARRYING OUT THE INVENTION

Hereinafter, the exemplary embodiments of the present invention will be described in detail with reference to the accompanying diagrams. First, the terms and the words used in this specification and claims should not be interpreted as limited to commonly used meanings or dictionary meanings and should be interpreted with meanings and concepts which are consistent with the technological scope of the invention based on the principle that the inventors have appropriately defined concepts of terms in order to describe the invention in the best way.

Therefore, the exemplary embodiments described in the present specification and the configurations shown in the diagrams are only the most preferred exemplary embodiments of the present invention, and do not represent all the technological scope of the present invention, so it should be understood that there may be various equivalents and modifications that can substitute them at the time of this application.

Hereinafter, an exemplary embodiment of the present invention will be described with reference to FIG. 2 to FIG. 4.

FIG. 2 is a perspective view of a battery tray according to an exemplary embodiment of the present invention, FIG. 3 is a top view of a battery tray according to an exemplary embodiment of the present invention, and FIG. 4 is a diagram showing a state in which battery trays are stacked according to an exemplary embodiment of the present invention.

Referring to FIG. 2 to FIG. 4, in the battery tray 100, the housing 110 in which the battery is accommodated is formed in a square shape with the top side open, and multiple batteries may be accommodated therein in a standing state. In the battery tray 10, multiple insertion holes 120 into which charge/discharge terminals are inserted and multiple heat dissipation holes 130 for air flow are formed at the bottom part of the housing 110.

The heat dissipation hole facilitates the flow of heat generated from the battery from the center part to the outer part of the tray, and when the trays are stacked, it facilitates the flow of heat from the lower part to the upper part of the tray stack. Therefore, since the battery tray of the present invention facilitates the flow of heat emitted from the battery during the activation process, it reduces the temperature deviation between the batteries according to the location where the batteries are accommodated. And in the conventional tray structure, in the case of a battery housed in the center of the tray, heat does not move to the outside and stays as it is, so the battery performance may be deteriorated by not being able to be properly cooled, and such problem may also be improved.

Multiple pockets 140 are provided in the battery tray 100 to accommodate multiple batteries at a constant pitch. These pockets 140 are formed at a constant pitch in the X-direction (width direction) and the Y-direction (longitudinal direction), respectively, and batteries are accommodated one by one in these pockets 140.

Partition walls 150 are installed in the battery tray 100, and pockets 140 having a rectangular shape are formed to be surrounded on all sides by the partition walls 150. The partition walls 150 are formed along the width direction (X-direction) and the longitudinal direction (Y-direction) of the battery tray.

The pocket 140 allows the cylindrical battery to be held in an upright state. In other words, the pocket is designed so that the cylindrical battery can be accommodated therein in a standing state. At the bottom of the pocket, the cylindrical battery is placed in an upright state.

As for the insertion hole 120, one insertion hole is provided at the center of the bottom of each pocket 140, and the charge/discharge terminal of the battery can be inserted into this insertion hole.

The heat dissipation hole 130 facilitates the flow of heat generated from the battery during the activation process, and is formed at the bottom part of the tray. The heat dissipation hole is formed on the outer periphery of the insertion hole, and 2 to 5 heat dissipation holes are formed on the outer periphery of each insertion hole.

The diameter of the heat dissipation hole is 3 mm to 12 mm, preferably 4 mm to 10 mm, and more preferably 5 mm to 9 mm. The larger the diameter of the heat dissipation hole, the smoother the airflow in the tray, which is advantageous in terms of heat flow, but if the diameter of the heat dissipation hole is too large, the rigidity of the battery tray may be weakened, so the diameter of the heat dissipation hole is preferably within the above range.

Meanwhile, to ensure uniform airflow, the arrangement of the heat dissipation holes in the bottom part of a single pocket is, as shown in FIG. 3, in the form in which heat dissipation holes are arranged around each of the four vertices of the pocket bottom part.

The housing 110 accommodates multiple batteries therein, and includes a bottom part, and side walls 112 each vertically extending from the four edge parts of the bottom part and having a predetermined height.

The bottom part is a part that contacts the lower surface of the battery accommodated inside the housing, and has a rectangular shape. On the four outer sides of the bottom part, which are the left side in the longitudinal direction, the right side in the longitudinal direction, the left side in the width direction, and the right side in the width direction, side walls extending in the vertical direction are respectively installed.

Similar to the bottom part, multiple side wall heat dissipation holes 160 are formed on the side wall 112 to facilitate heat flow of the tray. These side wall heat dissipation holes 160 are formed on each of the four side walls, and the side wall heat dissipation holes may be spaced apart from each other at constant spacings. By forming heat dissipation holes on the side wall, heat generated from the battery can flow through the side of the tray, which is more effective in achieving the object of the present invention.

Referring to FIG. 4, the battery tray of the present invention has a structure capable of stacking multiple battery trays in the vertical direction.

The height of the side wall is higher than the height of the partition wall, so that the partition wall of the lower tray does not interfere with the bottom surface of the upper tray when the battery trays are stacked in the vertical direction. Specifically, the height of the partition wall may be 50% to 95% of the height of the side wall.

Such battery trays may be manufactured by injection molding of industrial thermoplastics such as engineering plastics. When injection molding is performed after making the cavity of the mold for manufacturing the battery tray into a shape considering the partition wall, the insertion hole, and the heat dissipation hole of the present invention, a battery tray in which a partition wall, an insertion hole, and a heat dissipation hole are integrally formed may be manufactured.

Meanwhile, the present invention provides a method for manufacturing a battery that performs an activation process by accommodating multiple batteries.

The activation method may include the process of initially charging the battery to SOC 20% to 60%, the process of aging the battery, and the process of fully charging and fully discharging the battery so that a battery in which battery assembly has been completed may be used, and since the specific details of the activation process depend on a known method, further description will be omitted.

Since the battery tray of the present invention has improved heat flow, when the activation process is performed in a state where the battery is accommodated in the battery tray of the present invention, there are effects of reducing the temperature deviation according to the accommodation position of the battery and dramatically improving the capacity deviation by uniformizing the temperature increase rate and the cooling rate.

FIG. 5 is a top view of a battery tray according to another exemplary embodiment of the present invention. Referring to FIG. 5, a partition wall 250 is installed in the battery tray 200 of the present invention, and a square-shaped pocket 240 is formed to be surrounded on all sides by the partition wall 250. The partition wall 250 is formed along the diagonal direction of the battery tray 200. In an exemplary embodiment shown in FIG. 5, the arrangement of the pocket is changed in contrast to the pocket of an exemplary embodiment shown in FIG. 2 and FIG. 3. That is, the battery tray of the exemplary embodiment shown in FIG. 5 is configured in a form in which the pockets are rotated by 45°, that is, in contact with each other face-to-face along the diagonal direction of the battery tray 200, thereby reducing wasted space and allowing greater number of batteries to be accommodated.

Referring to FIG. 5, the lowest pocket of the leftmost column is in contact with the lower side in the width direction, and the uppermost pocket of the next right column is in contact with the upper side in the width direction. In this way, it is arranged in a form in which the pockets are staggered in a zigzag, so that one column is in contact with the lower side in the width direction and the other column is in contact with the upper side in the width direction when two adjacent columns are compared. In other words, instead of simply disposing rows, which are arranged in the longitudinal direction so that the edges of the pockets meet each other in the width direction, several rows are arranged in the width direction by pasting one column facing downward and the next column facing upward without any empty space. As a result, more pockets can be arranged on the battery tray without wasted space, and more pockets can be arranged within the same area.

Hereinafter, the present invention will be described in more detail through exemplary embodiments and the like. However, since the configurations described in the exemplary embodiments described in this specification are only an exemplary embodiment of the present invention and do not represent all of the technological scope of the present invention, it should be understood that there may be various equivalents and modifications that can replace them at the time of this application.

Example 1

A battery tray (outer size of 540 mm×540 mm, pitch of pockets is 30 mm, and the total number of pockets is 256) as shown in FIG. 2 and FIG. 3 was prepared. At the bottom part of each pocket of the prepared tray, one insertion hole for inserting a charge/discharge terminal was formed, and heat dissipation holes each having a diameter of 5.6 mm were formed around four vertices.

Example 2

A battery tray in which the diameter of the heat dissipation hole in the battery tray of Example 1 is changed to 7.0 mm was prepared.

Example 3

A battery tray in which the diameter of the heat dissipation hole in the battery tray of Example 1 is changed to 8.4 mm was prepared.

Comparative Example

A battery tray in which no heat dissipation hole is formed in the battery tray of Example 1 was prepared.

Experimental Example 1: Temperature Measurement

Cylindrical batteries having a diameter of 21.45 mm were accommodated in each battery tray pockets of Example 2, and initial charging and high-temperature aging were performed on the batteries in a state in which the trays accommodating the batteries were stacked in 5 layers.

Thereafter, in an atmosphere where the temperature is 25° C., the atmospheric temperature of the center part and the outer part of the tray on the third layer, which is at the center of the tray stack, was measured over time, and the results are shown in FIG. 6.

For the battery tray of the comparative example, the same experiment was performed as described above, and the results are shown in FIG. 7.

Referring to FIG. 6 and FIG. 7, in both trays according to Example 2 and Comparative Example, since the temperature around the trays increases due to self-heating of the battery, the temperature of the part where the temperature is measured shows an increasing pattern at the beginning.

In the tray of Example 2, the temperature of the center part of the third layer rose to a maximum of 72° C., the temperature of the outer part of the third layer rose to a maximum of 67° C., and the temperature difference between the center part and the outer part had a maximum of 5° C. In addition, it was found that the outer part in which heat flow is favorable achieved temperature equilibrium after approximately 6 hours, and the center part, which is relatively unfavorable in terms of heat flow, achieved temperature equilibrium after approximately 8 hours.

In the tray of Comparative Example, the temperature difference between the center part of the third layer and the outer part of the third layer was approximately 20° C. after approximately 4 hours has passed, and was approximately 10° C. after approximately 17 hours has passed, so it can be seen that the temperature difference between the center part and the outer part is big compared to the tray in Example 2. In addition, it is shown that the temperature increasing trend continues even after 17 hours have elapsed in the center part, where heat flow is relatively unfavorable, so it can be confirmed that the center part of the tray has poor heat flow.

Experimental Example 2: Heat Flow Measurement

DT_max was measured for the trays of Examples 1 to 3, and the results were tabulated in Table 1. DT_max refers to the maximum temperature difference across the entire volume of the tray, and the smaller the DT_max, the better the heat flow.

TABLE 1

| | Example 1 | Example 2 | Example 3 |
|---|---|---|---|
| DT_max | 2.8 | 1.5 | 1.0 |

Referring to Table 1, it can be confirmed that the larger the diameter of the heat dissipation hole, the smaller the DT_max value, making it advantageous in terms of heat flow.

Although the present invention has been described above with limited exemplary embodiments and diagrams, it is not limited thereto, and various changes and modifications are possible within the range of equivalents of the claims to be made and the technological scope of the present invention by those skilled in the art to which the present invention belongs.

The invention claimed is:

1. A battery tray for accommodating multiple batteries during a battery manufacturing process, the battery tray comprising:

a housing having a bottom, the bottom having a plurality of insertion holes configured to receive a plurality of charge/discharge terminals and a plurality of heat dissipation holes configured to provide air flow; and a plurality of partition walls defining a plurality of pockets, each pocket being configured to store a battery, each pocket including one insertion hole of the plurality of the insertion holes at a bottom part of the pocket, wherein, in the bottom part of each pocket, at least one of the heat dissipation holes of the plurality of heat dissipation holes is located within the pocket at the bottom part of the pocket.

2. The battery tray of claim 1, wherein the one insertion hole is located at a center of the bottom part of the pocket.

3. The battery tray of claim 1, wherein the at least one of the heat dissipation holes of the plurality of heat dissipation holes is located on an outer periphery of the one insertion hole of the plurality of insertion holes.

4. The battery tray of claim 1, wherein, for each insertion hole, two to five heat dissipation holes of the plurality of heat dissipation holes are located on an outer periphery of the insertion hole.

5. The battery tray of claim 1, wherein a diameter of each heat dissipation hole is 3 mm to 12 mm.

6. The battery tray of claim 1, wherein the battery tray has an open top, and wherein each pocket is configured to store a cylindrical battery therein in a standing state.

7. The battery tray of claim 1, wherein the at least one of the heat dissipation holes of the plurality of heat dissipation holes is four heat dissipation holes arranged around four vertices of the bottom part.

8. The battery tray of claim 1, wherein the housing further comprises side walls vertically extending from four edges of the bottom, each side wall having a predetermined height.

9. The battery tray of claim 8, further comprising a plurality of side wall heat dissipation holes in the side walls.

10. The battery tray of claim 8, wherein the battery tray is configured to be stackable in a vertical direction.

11. A manufacturing method of a battery, comprising:

accommodating a plurality of batteries in the battery tray according to claim 1; and activating the plurality of batteries in the battery tray.

* * * * *